US010887482B2

(12) United States Patent
Aizono

(10) Patent No.: US 10,887,482 B2
(45) Date of Patent: Jan. 5, 2021

(54) IMAGE FORMING APPARATUS, METHOD OF CONTROLLING THE SAME, AND STORAGE MEDIUM

(71) Applicant: CANON KABUSHIKI KAISHA, Tokyo (JP)

(72) Inventor: Keisuke Aizono, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 101 days.

(21) Appl. No.: 16/200,964

(22) Filed: Nov. 27, 2018

(65) Prior Publication Data

US 2019/0166268 A1 May 30, 2019

(30) Foreign Application Priority Data

Nov. 29, 2017 (JP) ................................ 2017-229363

(51) Int. Cl.
*H04N 1/00* (2006.01)
(52) U.S. Cl.
CPC ..... *H04N 1/00482* (2013.01); *H04N 1/00639* (2013.01); *H04N 1/00641* (2013.01); *H04N 1/00676* (2013.01)

(58) Field of Classification Search
None
See application file for complete search history.

(56) References Cited

U.S. PATENT DOCUMENTS 8,068,261 B2 * 11/2011 Kobayashi ............. H04N 1/387
358/450
2014/0153051 A1 * 6/2014 Ma ..................... G03G 15/5062
358/1.18
2015/0161492 A1 * 6/2015 Saito ..................... G06K 15/16
358/1.12

FOREIGN PATENT DOCUMENTS

JP 2007083557 A 4/2007
JP 2017208646 A * 11/2017

* cited by examiner

*Primary Examiner* — Fan Zhang
(74) *Attorney, Agent, or Firm* — Venable LLP

(57) ABSTRACT

In an image forming apparatus having a function of laying out and forming a plurality of identical images on one output sheet, in a case that a setting is done to give different copy numbers to the identical images laid out on the one output sheet, control is performed, in accordance with the setting, to give and form the different copy numbers to the identical images laid out on the one output sheet.

14 Claims, 13 Drawing Sheets

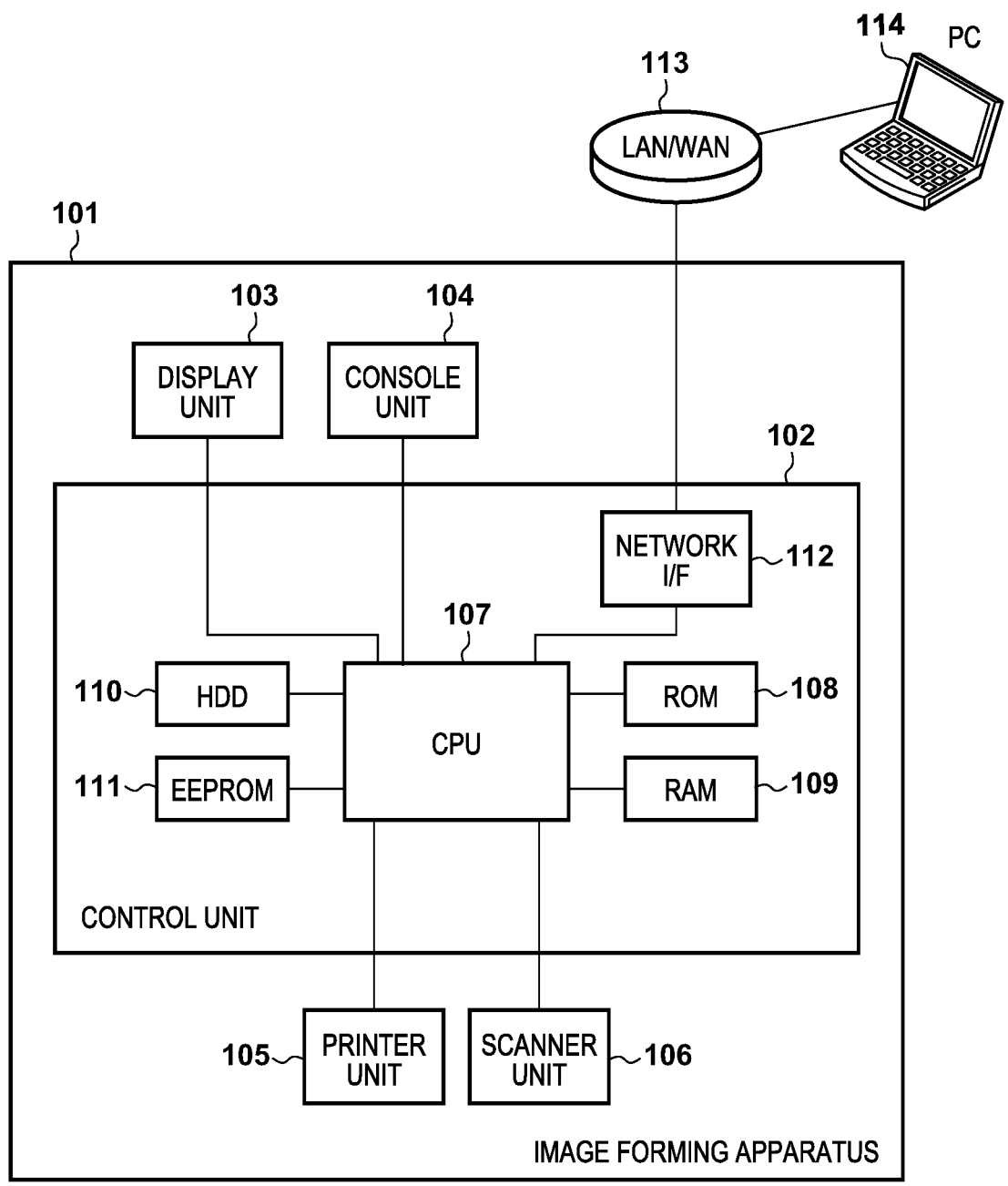

ORIGINAL / FRONT SIDE: A, C / BACK SIDE: B, D

SETTING OF DIFFERENT COPY NUMBERS WHEN SORT + DOUBLE COPY IS OFF ~ 801

SETTING OF DIFFERENT COPY NUMBERS WHEN GROUP + DOUBLE COPY IS OFF ~ 802

SETTING OF DIFFERENT COPY NUMBERS WHEN SORT + DOUBLE COPY IS ON ~ 803

SETTING OF DIFFERENT COPY NUMBERS WHEN GROUP + DOUBLE COPY IS ON ~ 804

SETTING OF DIFFERENT COPY NUMBERS WHEN SORT + DOUBLE COPY IS OFF ~1101

SETTING OF DIFFERENT COPY NUMBERS WHEN GROUP + DOUBLE COPY IS OFF ~1102

SETTING OF DIFFERENT COPY NUMBERS WHEN SORT + DOUBLE COPY IS ON ~1103

SETTING OF DIFFERENT COPY NUMBERS WHEN GROUP + DOUBLE COPY IS ON ~1104

IMAGE FORMING APPARATUS, METHOD OF CONTROLLING THE SAME, AND STORAGE MEDIUM

BACKGROUND OF THE INVENTION

Field of the Invention

The present invention relates to an image forming apparatus, a method of controlling the same, and a storage medium.

Description of the Related Art

There is conventionally a double copy function of laying out and copying a plurality of images of an original in one sheet. A user cuts a printed product obtained using the double copy function by a sheet cutting device, thereby obtaining a plurality of printed products of the copy of the original by, for example, one copy operation. More specifically, for example, two images of an original of A4 size are laid out and printed on a sheet of A3 size, and the printed product is cut at the center. With this processing, the printed products of two copies of the original of A4 size can be obtained by a charge fee for one sheet of A3 size.

Japanese Patent Laid-Open No. 2007-83557 proposes that in a case in which the number of originals to be copied on one sheet is odd, another original is continuously laid out to reduce waste of the sheet.

In the conventional technique, however, when copy number print for printing a copy number on each printed product is set, and double copy is performed, the same copy number is printed in regions where the printed products before cutting are laid out. For this reason, when cutting is performed, a plurality of final products with the same copy number printed are obtained, and the uniqueness of the copy numbers of the final products is compromised.

SUMMARY OF THE INVENTION

An aspect of the present invention is to eliminate the above-mentioned problem with conventional technology.

A feature of the present invention is to provide a technique of, when copy number print is set, and a function of laying out and forming a plurality of identical images on one output sheet is executed, preventing a plurality of final products with the same copy number printed from being obtained by cutting the output sheet.

According to a first aspect of the present invention, there is provided an image forming apparatus having a function of laying out and forming a plurality of identical images on one output sheet, the image forming apparatus comprising: a memory device that stores a set of instructions; and at least one processor that executes the instructions stored in the memory to function as: a setting unit configured to perform a setting to give different copy numbers to the identical images laid out on the one output sheet; and a control unit configured to perform control, in accordance with the setting by the setting unit, to give and form the different copy numbers to the identical images laid out on the one output sheet.

According to a second aspect of the present invention, there is provided an image forming apparatus having a function of laying out and forming a plurality of identical images on one output sheet, the image forming apparatus comprising: a memory device that stores a set of instructions; and at least one processor that executes the instructions stored in the memory to function as: a setting unit configured to set a number of copies to be output; a copy number print setting unit configured to set to give a copy number representing the number of copies to the output sheet; and a control unit configured to, in a case that the function is selected and the copy number print setting unit sets to give the copy number representing the number of copies, perform control to give and form a copy number corresponding to the number of copies of an image after the output sheet is cut in accordance with the layout to images laid out on the output sheet.

According to a third aspect of the present invention, there is provided a method of controlling an image forming apparatus having a function of laying out and forming a plurality of identical images on one output sheet, the method comprising: setting a number of copies to be output; causing a user to set to give a copy number representing the number of copies to the output sheet; and in a case that the function is selected and a setting is done in the setting to give the copy number representing the number of copies, performing control to give and form a copy number corresponding to the number of copies of an image after the output sheet is cut in accordance with the layout to images laid out on the output sheet.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram showing the overall arrangement of a print system according to a first embodiment of the present invention;

DESCRIPTION OF THE EMBODIMENTS

Figure 2A:
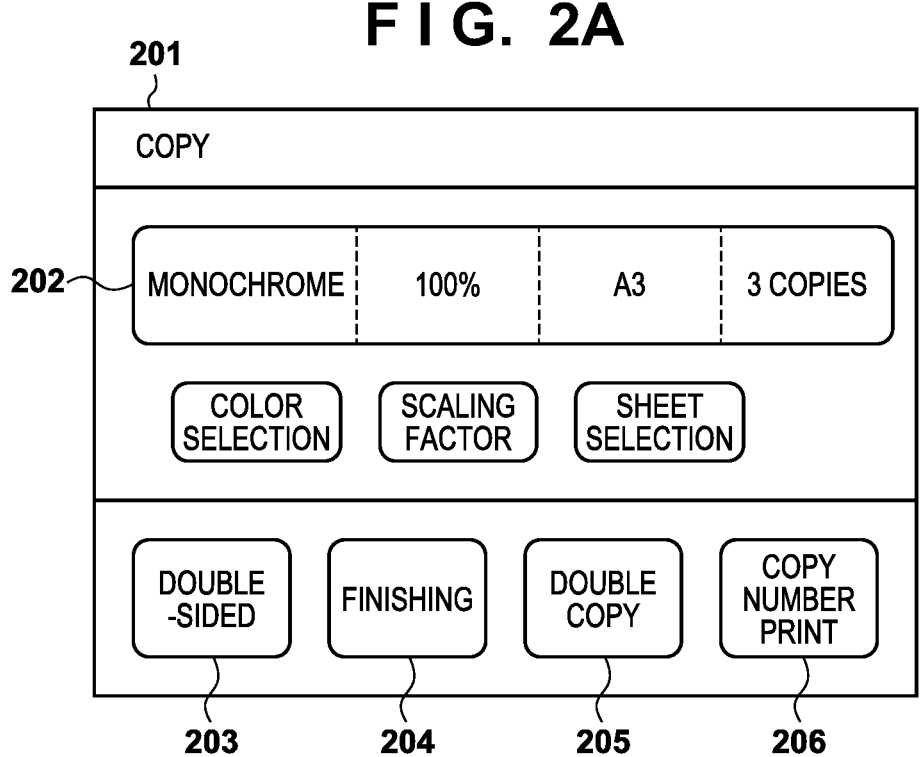
FIGS. 2A and 2B depict views showing setting screen examples of a copy function displayed on a display unit of an image forming apparatus according to the first embodiment.

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

FIG. 1 is a block diagram showing the overall arrangement of a print system according to the first embodiment of the present invention.

In this print system, an image forming apparatus 101 and a personal computer (PC) 114 are connected via a network such as a LAN/WAN 113. Upon receiving a print job transmitted from the PC 114, the image forming apparatus 101 executes printing in accordance with the print job.

The image forming apparatus 101 includes a control unit 102, a display unit 103, a console unit 104, a printer unit 105, and a scanner unit 106. The console unit 104 includes an LED or a display panel and displays the contents of an operation of a user or the internal information of the apparatus, and also receives an operation by the user. In addition, the console unit 104 includes a plurality of operation buttons, and may also be implemented as a touch display together with the display unit 103. The printer unit 105 receives a print instruction from the control unit 102 and prints an image on a sheet based on image data transmitted from the control unit 102. The scanner unit 106 reads an original in accordance with a read instruction from the control unit 102 and transmits image data obtained by reading the original to the control unit 102.

The control unit 102 includes a CPU 107, a ROM 108, a RAM 109, an HDD 110, an EEPROM (Electrically Erasable and Programmable Read-Only Memory) 111, and a network interface 112. At the time of start of the image forming apparatus 101, the CPU 107 executes a boot program stored in the ROM 108 and deploys a program stored in the HDD 110 to the RAM 109. Then, the CPU 107 executes the program deployed in the RAM 109, thereby controlling the operation of each unit connected to the control unit 102 via I/Fs, the memory of a storage medium, and the like. The ROM 108 is a read only memory and stores the boot program and the like needed to activate the system. The RAM 109 is a volatile memory, stores the deployed control program, and provides a work memory necessary for the CPU 107 to execute the program. The HDD 110 is a storage medium such as a magnetic disk and stores the control program, image data, and the like. The EEPROM 111 is a nonvolatile memory and stores set values and the like needed when executing the control program. The network interface 112 communicates with the PC 114 and the like via a network such as the LAN/WAN 113.

Note that in the first embodiment, the image forming apparatus 101 includes a scanner configured to read an original in addition to the print function. However, the present invention is not limited to this. The image forming apparatus may have only the print function and may be configured to receive the image data of an original from an externally connected image reading apparatus such as a scanner and print.

Functions associated with a copy function in the image forming apparatus 101 according to the first embodiment will be described next with reference to FIGS. 2A to 6.

FIGS. 2A, 2B, 3A, and 3B depict views showing examples of setting screens of the copy function displayed on the display unit 103 of the image forming apparatus 101 according to the first embodiment. These setting screens are output by the CPU 107 to the display unit 103. When a user operation is received via the console unit 104, various kinds of settings via the setting screens are done.

FIG. 2A depicts a view showing an example of the main setting screen for the copy function.

A copy setting screen 201 includes basic settings 202, a double-sided printing button 203, a finishing button 204, a double copy button 205, and a copy number print button 206. The basic settings 202 are set values necessary for executing the copy function and include a color mode, a scaling factor, a sheet type, and the number of copies. The double-sided printing button 203 is a button to designate double-sided printing for printing both surfaces of a sheet. The initial value is single-sided printing. The finishing button 204 is a button to designate in what order printed products should be output. When the user presses the finishing button 204, the CPU 107 displays a finishing setting screen 211 shown in FIG. 2B.

Figure 2B:
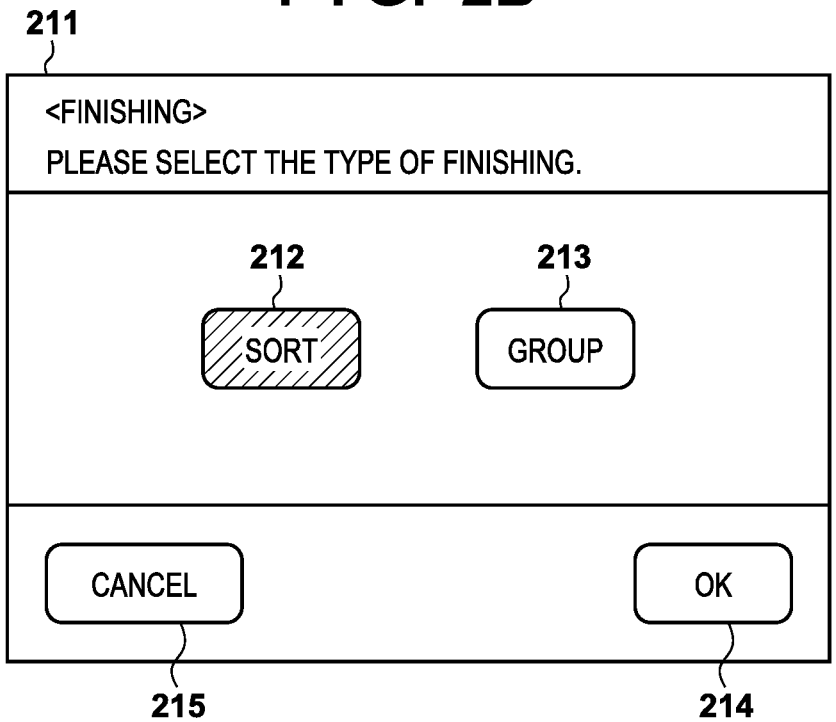

The finishing setting screen 211 includes a sort button 212, a group button 213, an OK button 214, and a cancel button 215. When the OK button 214 is pressed after receiving the pressing of the sort button 212 or the group button 213, the CPU 107 stores the information of the pressed button in the RAM 109 as a setting of a copy job and returns to the copy setting screen 201. On the other hand, when the cancel button 215 is pressed, the CPU 107 cancels the setting on the finishing setting screen 211 and returns to the copy setting screen 201. Note that FIG. 2B shows a state in which "sort" is selected as finishing.

Figure 4:
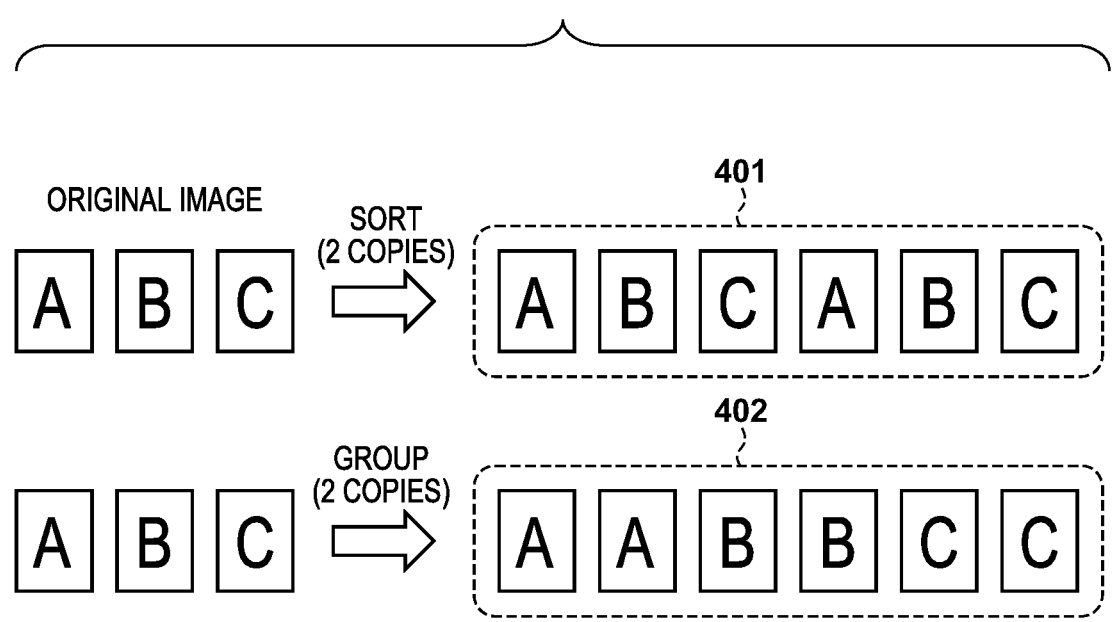
FIG. 4 depicts a view for explaining sort output by a sort button and group output by a group button.

FIG. 4 depicts a view for explaining sort output by the sort button 212 and group output by the group button 213.

Sort output is an output form in which, for example, when a set of originals A, B, and C exists, generation of printed products of the set of the originals A, B, and C is repetitively executed, like A, B, C, A, B, C, . . . as many times as the set number of copies, as indicated by reference numeral 401 in FIG. 4. As a detailed example, reference numeral 401 denotes an output result obtained when sort output is set for the originals including the originals A, B, and C, and the number of copies is set to 2.

Group output is an output form in which, for example, when a set of originals A, B, and C exists, the first original A is output as many as the number of copies, the next original B is then similarly output as many as the number of copies, and formation is sequentially performed even for the subsequent original in a similar manner, as indicated by reference numeral 402 in FIG. 4. As a detailed example, reference numeral 402 denotes an output result obtained when group output is set for the originals A, B, and C, and the number of copies is set to 2.

Referring back to FIG. 2A, double copy will be described.

The double copy button 205 is a button to set to output identical images in a layout of double copy. When the user presses the double copy button 205 on the copy setting screen 201, the CPU 107 displays, for example, a double copy setting screen 301 shown in FIG. 3A. The double copy setting screen 301 includes double copy ON/OFF buttons 302, an original size 303, an original size change button 304, an "align cutting edge" check box 305, an OK button 306, and a cancel button 307. The operations of the OK button 306 and the cancel button 307 are basically the same as those of the OK button 214 and the cancel button 215 described above, and a description thereof will be omitted.

Double copy will be described first.

Figure 5:
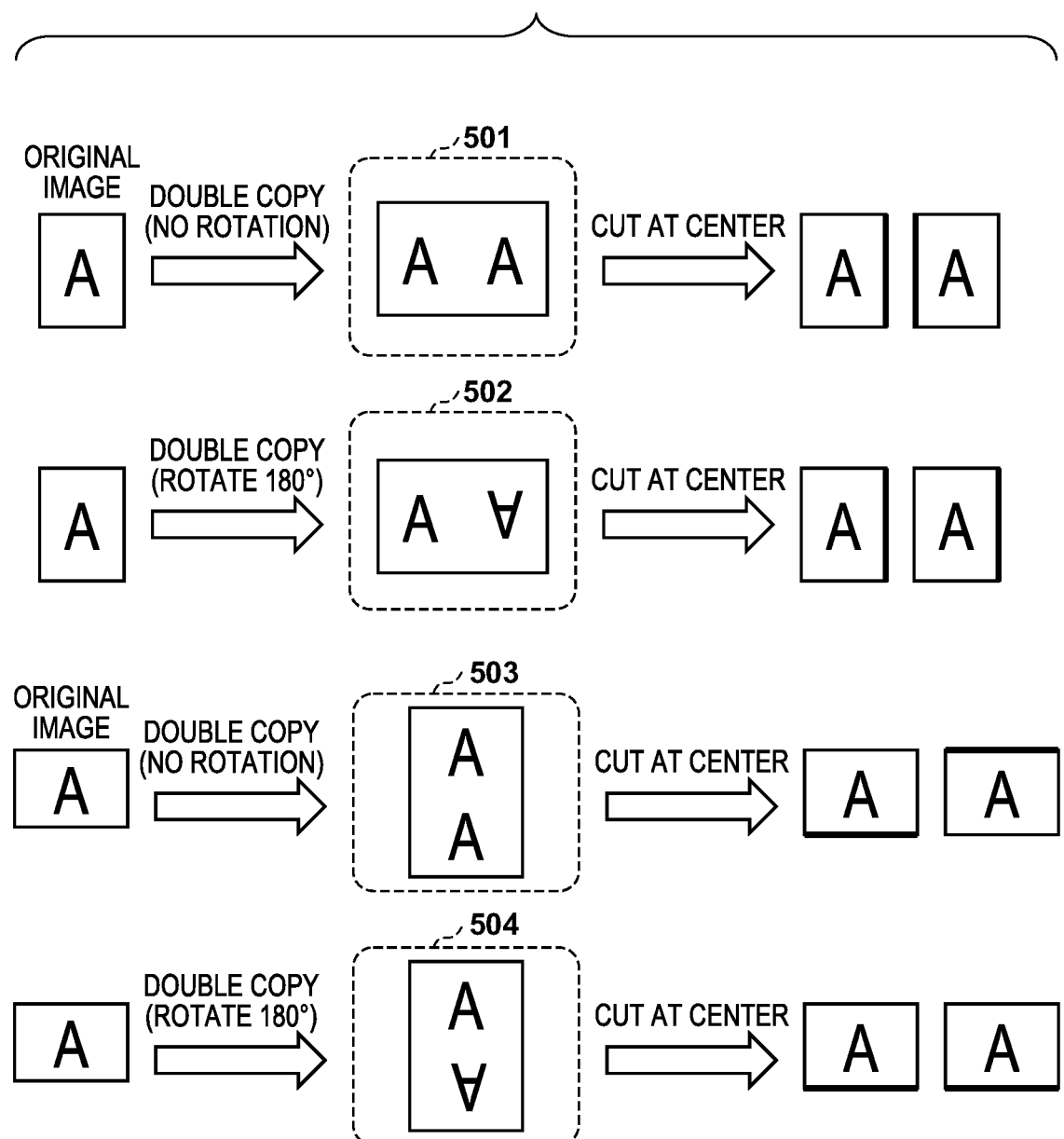
FIG. 5 depicts a view for explaining examples obtained by double-copying an original image.

FIG. 5 depicts a view for explaining examples obtained by double-copying an original image.

Double copy is a function of laying out a plurality of images of one original on one sheet and printing, as shown in FIG. 5. That is, in double copy, a plurality of images that are the same as one original image (input image) are laid out and printed (formed) on one sheet. Each of a plurality of identical images laid out on one sheet corresponds to one input image. The user cuts the sheet printed using the double copy function, thereby obtaining a plurality of printed products by the copy on one sheet. To do this, margins are calculated such that each printed product after cutting becomes the same as the original image, and each layout region (the original image that is laid out) in one sheet is decided. In the first embodiment, processing of laying out two original images on one sheet will be described as an example. However, three or more original images may be laid out.

The original size 303 of the double copy shown in FIG. 3A will be described first.

In the double copy, an output image is laid out based on the size (size after cutting) designated by the original size 303. At this time, the orientation of the original image to be laid out in each layout region is decided in consideration of the setting of the "align cutting edge" check box 305 as well. A change of the original size is received from the original size change button 304. A size equal to or smaller than ½ the sheet size set in the basic settings 202 of the copy setting screen 201 shown in FIG. 2A can be selected. For example, if the sheet size is A3, as shown in FIG. 2A, a size equal to or smaller than the A4 size that is ½ the A3 size can be selected.

Layouts of double copy will be described next with reference to the output examples shown in FIG. 5.

Output results indicated by reference numerals 501 and 502 show output examples in a case in which a portrait original is double-copied, and original images are laid out so as to be arranged in the horizontal direction. At this time, if the "align cutting edge" check box 305 has a check mark, the second original image is printed in a state in which it is rotated by 180°, as indicated by reference numeral 502. Accordingly, when the sheet obtained by the double copy is cut at the center in the vertical direction, the cutting edges of final products can be aligned in one direction. If the "align cutting edge" check box 305 has no check mark, rotation is not performed, and the original images are printed as indicated by reference numeral 501. Note that the print position of a copy number to be described later is decided based on the orientation of each layout region.

Reference numerals 503 and 504 denote output examples obtained in a case in which a landscape original is double-copied, and original images are laid out so as to be arranged in the vertical direction. At this time, if the "align cutting edge" check box 305 has a check mark, the original image on the lower side is printed in a state in which it is rotated by 180°, as indicated by reference numeral 504. Accordingly, when the sheet obtained by the double copy is cut at the center in the horizontal direction, the cutting edges of final products can be aligned in one direction. If the "align cutting edge" check box 305 has no check mark, rotation is not performed, and the original images are output as indicated by reference numeral 503. Note that in this case as well, the print position of a copy number is decided based on the orientation of each layout region.

In addition, as the number of copies in the basic settings 202 at the time of double copy, not the number of copies of final products but the number of copies at the time of printing is received. For example, if "3" is input to the basic settings 202 in a state in which the double copy button 205 is ON in FIG. 2A, three printed products each having the layout of double copy are output. When the user cuts each of the sheets of the three copies, six copies of products can be obtained. The number of copies "6" after cutting shown in FIG. 3A corresponds to this example.

Referring back to FIG. 2A again, and screen for setting a copy number print will be described.

The copy number print button 206 is a button to set to print a copy number on a printed product output by the copy function. The copy number in this embodiment is one of serial numbers starting from 1, and indicates the number of the copy of a printed product. When the user presses the copy number print button 206 in the copy setting screen 201, the CPU 107 displays a copy number print setting screen 311 as shown in FIG. 3B.

The copy number print setting screen 311 includes a print position setting 312, an orientation setting 313, a "print different copy numbers in double copy" check box 314, an OK button 315, and a cancel button 316. The operations of the OK button 315 and the cancel button 316 are basically the same as those of the OK button 214 and the cancel button 215 described above, and a description thereof will be omitted.

Figure 6:
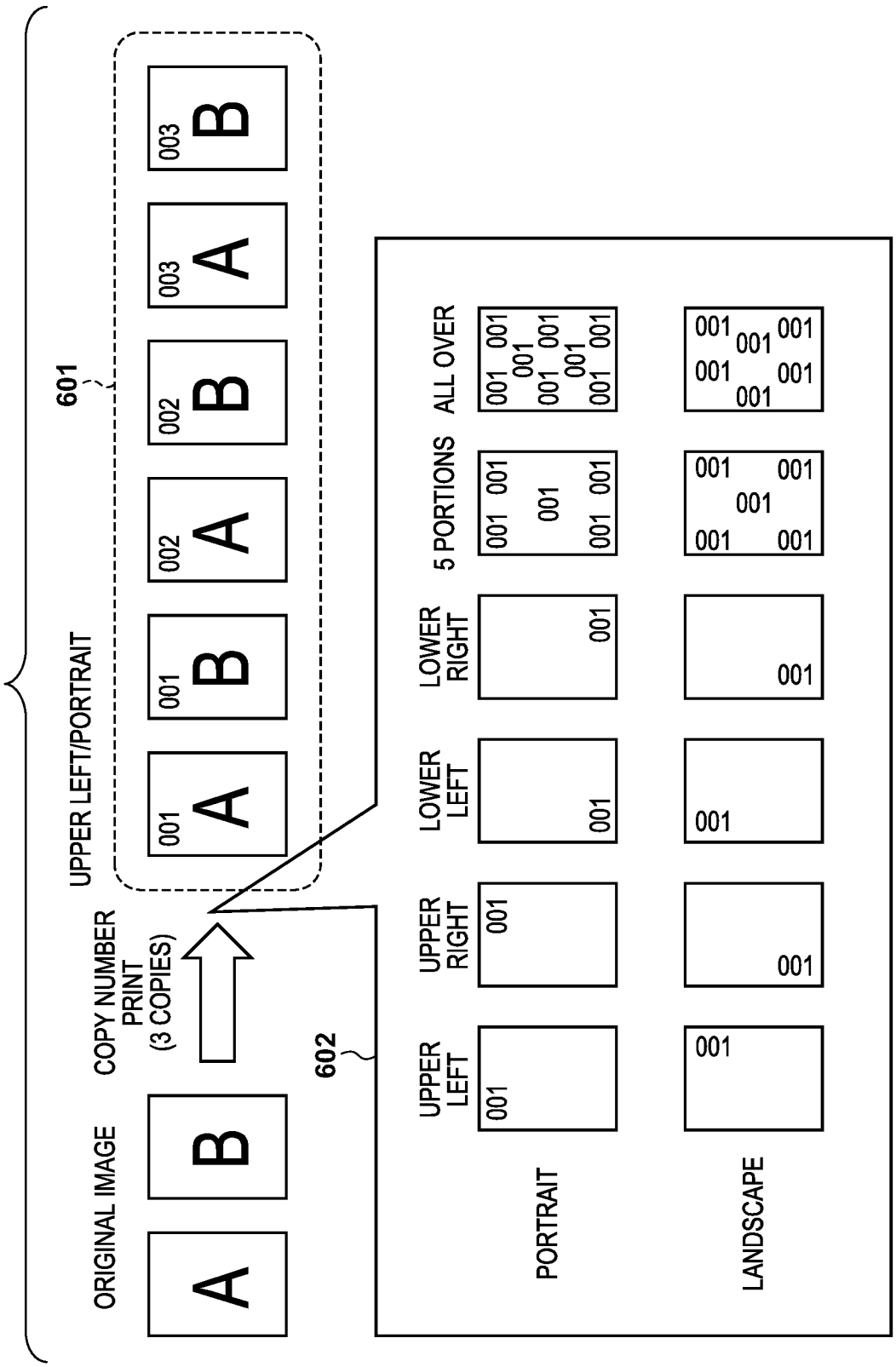
FIG. 6 depicts a view for explaining copy number print when printing three copies of two originals.

Copy number print will be described first. Copy number print is a function of printing, on a printed product output by the copy function, a copy number representing the number of copies of the printed product, as shown in FIG. 6. This makes it possible to uniquely specify a printed product even if it is a copied printed product.

FIG. 6 depicts a view for explaining copy number print when printing three copies of two originals. Note that a case in which double copy is not performed will be described here.

In the copy number print function, the position of a copy number in a printed product and the orientation of the copy number are decided by the print position setting 312 and the orientation setting 313 shown in FIG. 3B. Each of "upper left", "upper right", "lower left", and "lower right" in the print position setting 312 indicates printing a copy number at one of the four corners of a printed product, and "five portions" indicates printing a copy number at each of five portions including all the four corners and the center. In addition, "all over" indicates printing a copy number all over a printed product. The orientation setting 313 is a setting as to whether characters of a copy number should be printed in a portrait orientation (vertical direction) or in a landscape orientation (lateral direction) based on the orientation to print the original image.

As a detailed example, reference numeral 601 in FIG. 6 indicates an output result in a case in which two originals are printed while setting the number of copies to 3, and each copy number is printed at the upper left in the portrait orientation. Reference numeral 602 explains the relationship between the orientation of the original and the print position of the copy number. However, when double copy and copy number print are simultaneously set, a problem is posed in some cases. Double copy is a function of copying a plurality of images of an original in one sheet. If the same copy number is printed in each layout region, a plurality of final products with the same copy number are obtained after cutting, and the uniqueness of the copy numbers of the final products is compromised.

To prevent this, the "print different copy numbers in double copy" check box 314 is provided in the copy number print setting screen 311 to enable to set whether to assign different copy numbers to the layout regions. That is, when the check box 314 has a check mark, a setting to add a different copy number to each of a plurality of identical images laid out in one printed sheet is enabled. More specifically, how to assign the copy numbers will be described using a detailed example with reference to FIGS. 8 to 13 after the overall procedure of the copy function is described with reference to FIG. 7.

Figure 7:
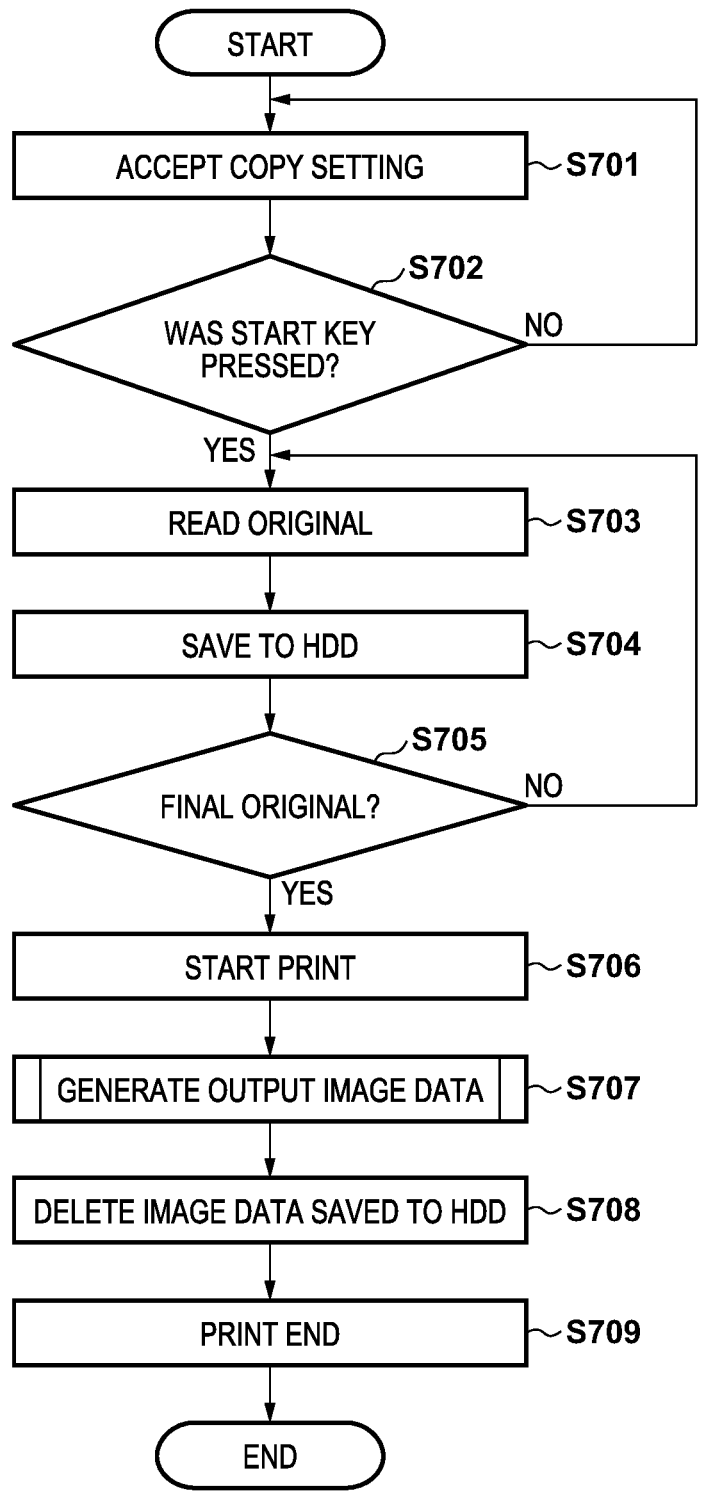
FIG. 7 is a flowchart for describing copy processing in the image forming apparatus according to the first embodiment.

FIG. 7 is a flowchart for describing copy processing in the image forming apparatus 101 according to the first embodiment. This processing is achieved by deploying a program stored in the HDD 110 to the RAM 109 by the CPU 107 and executing the deployed program.

First, in step S701, the CPU 107 displays a copy setting screen such as the copy setting screen 201 on the display unit 103. Next, the process advances to step S702, and the CPU 107 receives a setting change until a start key is pressed on the console unit 104. Upon detecting that the start key is pressed in step S702, the process advances to step S703, and the CPU 107 instructs the scanner unit 106 to read an original. In step S704, the CPU 107 temporarily saves, in the HDD 110, the image data of the original received from the scanner unit 106. At this time, when reading both surfaces of the original, the image data are saved in the order of front side and back side. The original reading processing is repeated until it is determined in step S705 that reading of the final original is ended.

When the CPU 107 determines in step S705 that reading of the final original is ended, the process advances to step S706, and the CPU 107 outputs a print start instruction to the printer unit 105. The printer unit 105 thus waits for reception of output image data from the CPU 107. When the output image data is received from the CPU 107, a state in which the output image data can be printed is obtained.

In step S707, the CPU 107 generates image data to be printed and outputs the image data to the printer unit 105. Details of the output image data generation processing in step S707 will be described later with reference to the flowcharts of FIGS. 9 and 10 and the like. In this processing, the processes of the output order of finishing, layout of double copy, and copy number print are also performed.

When generation of all output image data and image data output to the printer unit 105 are thus completed in step S707, the process advances to step S708, and the CPU 107 deletes the image data of the original saved in step S704. The process advances to step S709, and the CPU 107 outputs a print end instruction after receiving a print completion notification from the printer unit 105. Upon receiving the print end instruction, the printer unit 105 ends reception of output image data and stops the operation associated with printing. Copy of the original can be performed by the series of processes.

How to generate print image data in step S707 will be described next. However, how the output is performed in a case in which double copy and copy number print are simultaneously set in the first embodiment will be described first with reference to FIG. 8.

Figure 8:
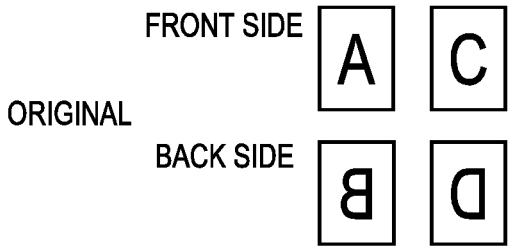
FIG. 8 depicts a view showing output examples in a case in which two double-sided originals are double-copied, and the position of copy number print is set at the upper left in the first embodiment.

FIG. 8 depicts a view showing output examples in a case in which two double-sided originals are double-copied, and the position of copy number print is set at the upper left in the first embodiment.

Reference numeral 801 denotes an output example in a case in which "sort" is selected in the finishing setting shown in FIG. 2B, and the check mark in the "print different copy numbers in double copy" check box 314 is turned off in FIG. 3B in addition to the above-described settings. In this example, the same copy number "001" is printed in each layout region (upper left) of the sheets of the first copy in the portrait orientation, and printing is performed in the sort order. Reference numeral 802 denotes an example in which the finishing setting of the example 801 is changed to "group". The same printed products as in the example 801 are obtained except the output order. In the case of printed products indicated by reference numerals 801 and 802, a plurality of sheets with the same copy number printed for one original image are generated in the final products after cutting, as described concerning the problems with the conventional technology.

Reference numerals 803 and 804 denote output examples of "sort" and "group" in a case in which the check mark in the "print different copy numbers in double copy" check box 314 is checked. The manner the copy numbers are added to the printed products is different from the examples 801 and 802. In the examples 801 and 802, the same copy number is given to the layout regions. In the examples 803 and 804, different copy numbers are given to the layout regions (upper left) of one output sheet in the portrait orientation. More specifically, in the first embodiment, continuous copy numbers corresponding to the number of copies of an image in the layout regions (the number of copies after cutting in FIG. 3A) are assigned to the layout regions of one double-copied output sheet. This can eliminate the problem that a plurality of sheets with the same copy number printed for one image in the sheets after cutting.

Print image data generation processing will be described next.

Figure 9:
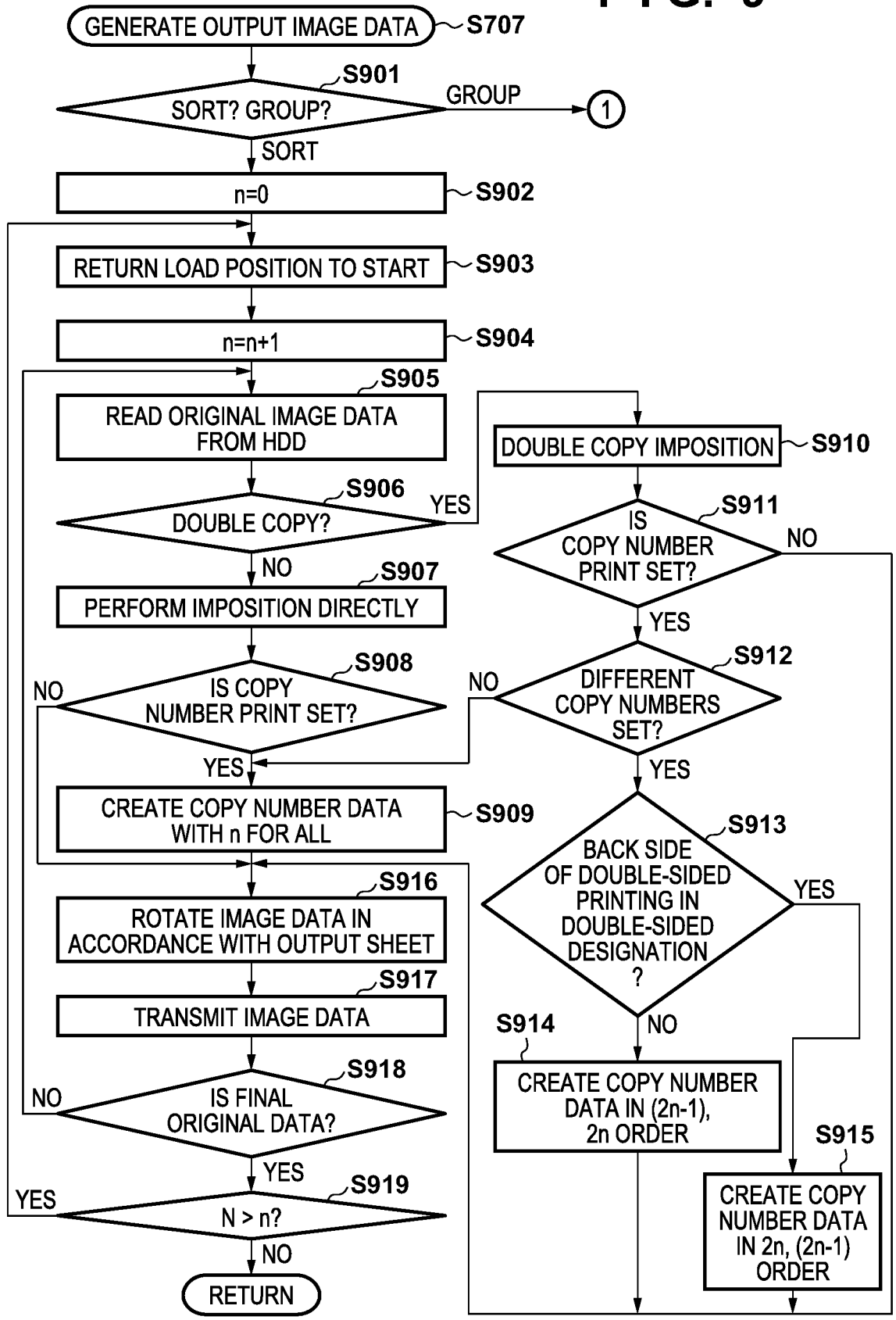
FIG. 9 is a flowchart for describing print image data generation processing in step S707 of the flowchart of FIG. 7 according to the first embodiment.
Figure 10:
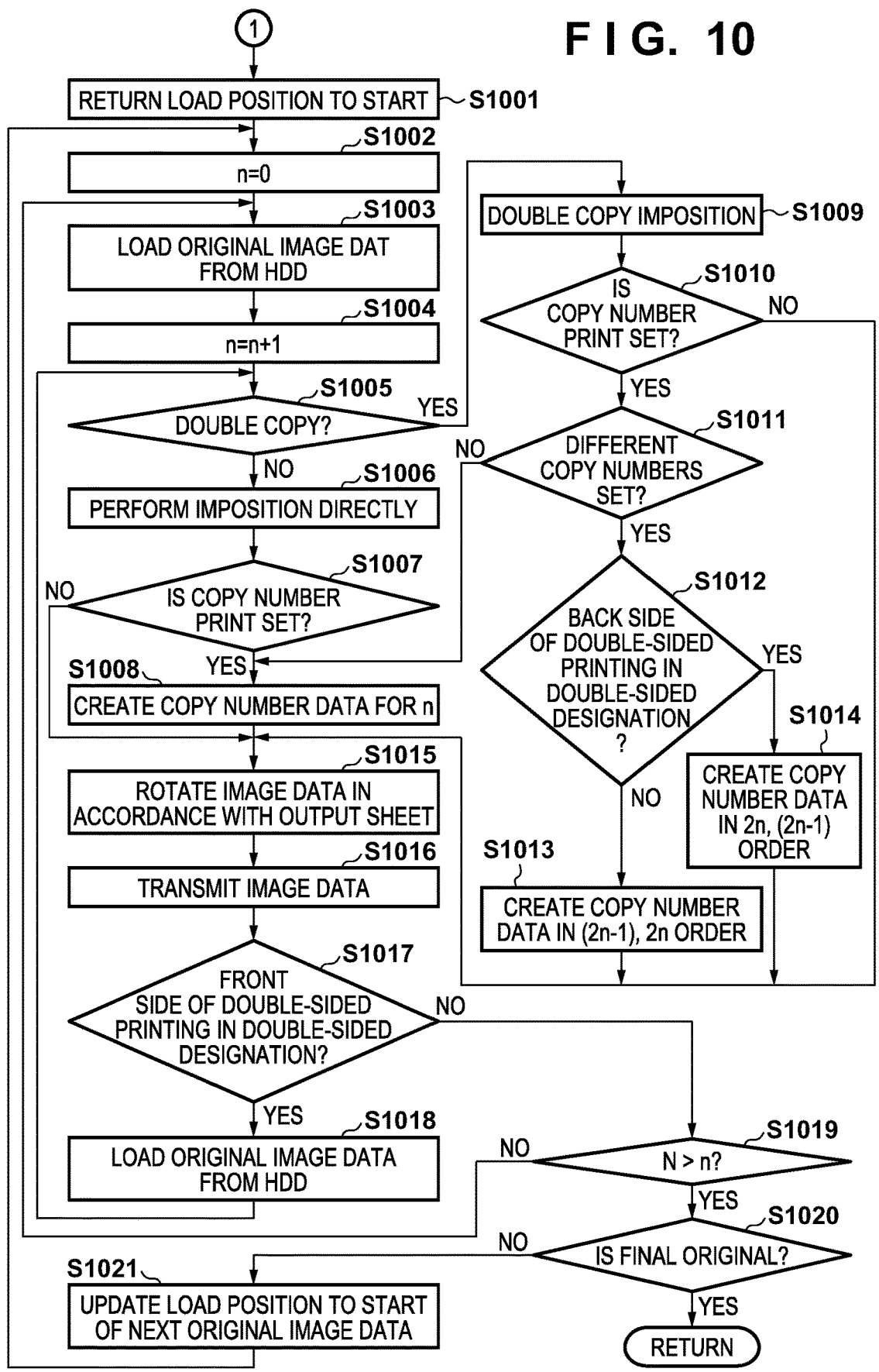
FIG. 10 is a flowchart for describing print image data generation processing in step S707 of the flowchart of FIG. 7 according to the first embodiment.

FIGS. 9 and 10 are flowcharts for describing print image data generation processing in step S707 of the flowchart of FIG. 7.

Variables N and n used in the flowcharts will be explained first before a description of detailed processing. Both the variables N and n indicate the number of copies. These variables are stored in the RAM 109. The variable N is the number of copies input by the user. More specifically, the variable N is the number of copies input in the basic settings 202 of the copy setting screen 201 shown in FIG. 2A, for example "3". The variable n is the number of copies when print processing is being performed. In addition, both the numbers of copies are the numbers of copies from the viewpoint of a printed product and do not necessarily match the copy number in copy number print (the copy number after cutting). Detailed processing will be described below.

First, in step S901, the CPU 107 determines which one of "sort" and "group" is selected in the finishing setting screen 211 shown in FIG. 2B. If "sort" is selected, the process advances to step S902. If "group" is selected, the process advances to step S1001 (FIG. 10). A case of sort output will be described first with reference to the flowchart of FIG. 9, and a case of group output will be described next with reference to the flowchart of FIG. 10.

In the sort output, in step S902, the CPU 107 initializes the variable n representing the number of copies during current print processing to "0". Next, the process advances to step S903, and the CPU 107 returns the load position of the image data of the original saved in the HDD 110 to the start position. Accordingly, a state in which image data can be obtained from the first image data of the original is obtained. Next, the process advances to step S904, and the CPU 107 increments the variable n by one. The process advances to step S905, and the CPU 107 loads image data of one original stored in the HDD 110 from the load position.

Figure 3A:
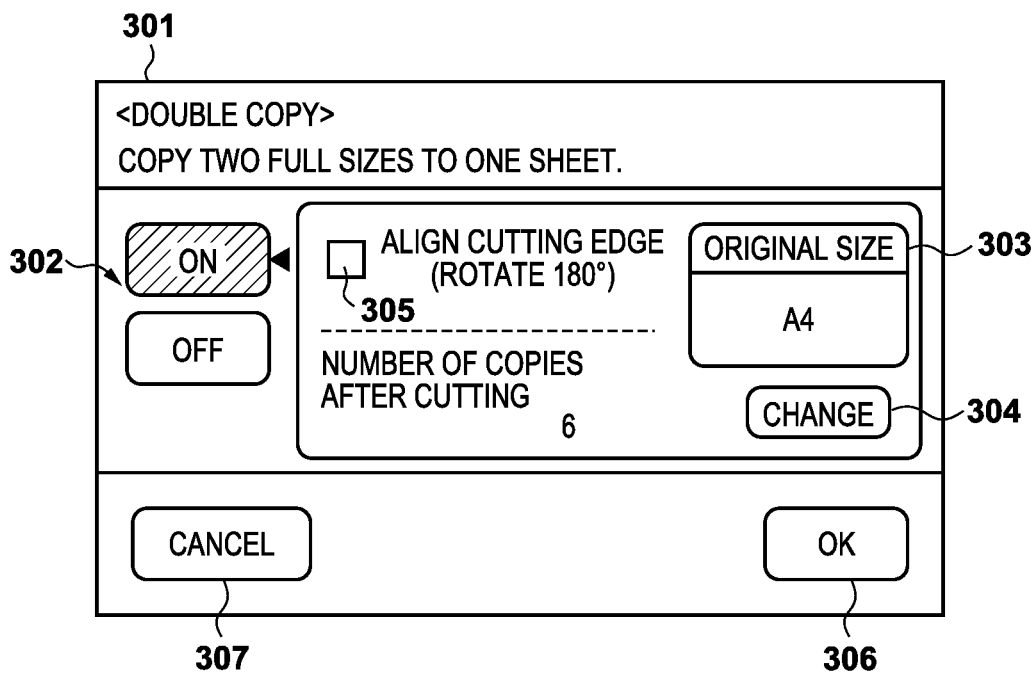
FIGS. 3A and 3B depict views showing setting screen examples of the copy function displayed on the display unit of the image forming apparatus according to the first embodiment.
Figure 3B:
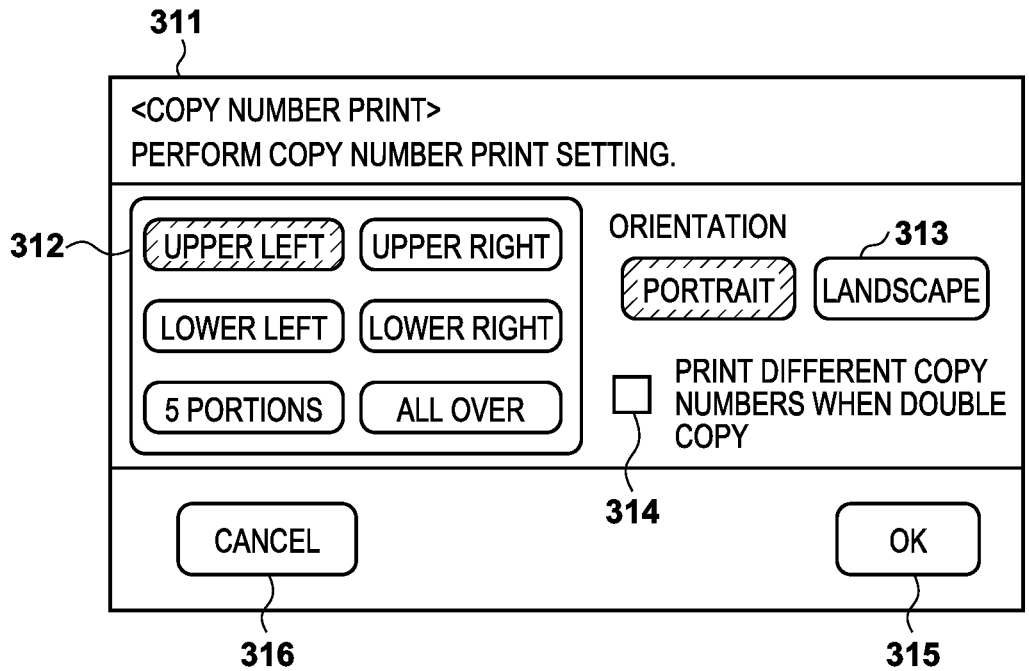

Next, the process advances to step S906, and the CPU 107 determines whether double copy is set by setting double copy to the ON state in the double copy setting screen 301 shown in FIG. 3A. Here, if double copy is not set, the process advances to step S907. The CPU 107 performs imposition directly using the image data of the original as output image data and advances to step S908. In step S908, the CPU 107 determines whether the copy number print is set in the copy number print setting screen 311 shown in FIG. 3B. Here, upon determining that the copy number print is not set, the process advances to step S916. On the other hand, upon determining that the copy number print is set, the process advances to step S909. The CPU 107 creates copy number data to print a copy number based on the value of the variable n, and advances to step S916. Note that in step S906, if double copy is not set, since one layout region exists in one sheet, one copy number is printed in the one layout region. The position and orientation (the direction of characters) of the copy number data at that time are decided based on the settings of the print position setting 312 and the orientation setting 313 in the copy number print setting screen 311.

On the other hand, if the CPU 107 determines in step S906 that the double copy is set, the process advances to step S910, and the CPU 107 performs imposition of double copy. In the imposition of double copy, for example, as described with reference to FIG. 5, the layout position and orientation of each image are decided based on the settings of the original size 303 and the "align cutting edge" check box 305 in the double copy setting screen 301. Next, the process advances to step S911, and the CPU 107 determines whether the copy number print is set in the copy number print setting screen 311. Here, upon determining that the copy number print is not set, the process advances to step S916 without performing copy number data creation processing.

On the other hand, upon determining in step S911 that the copy number print is set, the process advances to step S912 and the CPU 107 determines whether the "print different copy numbers in double copy" check box 314 is checked in the copy number print setting screen 311. If the check box 314 has no check mark, the process advances to step S909 to set the same copy number in the layout regions in one sheet. In this case, since the same copy number is set in the layout regions of the sheet, there is no need to be conscious of the front and back sides in double-sided setting. Hence, in step S909, copy number data with the copy number n is created for all layout regions (see 801 in FIG. 8).

On the other hand, if the CPU 107 determines in step S912 that the check box 314 has a check mark, the process advances to step S913. Here, there is a need to be conscious of the order of printing copy numbers on the front and back sides in double-sided printing, it is necessary to be conscious of the front and back sides. In step S913, the CPU 107 determines whether to generate output image data for the back side in double-sided printing. To generate image data only for one surface or for the front side in double-sided printing, the process advances to step S914. To generate image data for the back side in double-sided printing, the process advances to step S915. In step S914, the CPU 107 creates copy number data to print a copy number (2n−1) in one layout region of one sheet, creates copy number data to print a copy number 2n in the other layout region, and advances to step S916. For example, when n=1, copy number data "1" and "2" are created for the layout regions, respectively. When n=2, copy number data "3" and "4" are created for the layout regions, respectively (see the front side in the example 803 shown in FIG. 8). At this time, the print position and orientation of each copy number data are decided based on the orientation of each layout and the print position setting 312 and the orientation setting 313 in the copy number print setting screen 311.

On the other hand, to generate image data for the back side in double-sided printing, in step S915, the CPU 107 creates copy number data to print copy numbers in an order reverse to the copy number order in step S914 and the processing advances to step S916. More specifically, when n=1, and the copy numbers on the front side are printed in an order of "1" and "2", copy number data for the back side are created such that the copy numbers are printed in an order of "2" and "1", and the process advances to step S916 (see the back side in the example 803 shown in FIG. 8). This is because, for example, in the example 803 shown in FIG. 8, when printing the back side of the first output sheet, an image "B" (copy number "002") on the back side of an image "A" with a copy number "002" is printed first.

With this processing, when the final products after cutting are viewed, matching of copy numbers between the final products can be ensured.

In step S916, the CPU 107 rotates the output image data in accordance with the output sheet such that the output image data can fit in the output sheet. Note that if the output image data directly fits in the output sheet, step S916 is skipped so the image data is not rotated. Next, the process advances to step S917, and the CPU 107 transmits the output image data (including the copy number data if the copy number print is designated) generated in the processing up to step S916 to the printer unit 105. The printer unit 105 thus prints the images. The process advances to step S918, and the CPU 107 determines whether printing up to image data of the final original saved in the HDD 110 is completed. If it is determined that the printing up to the image data of the final original is completed, printing of the first copy of original is completed. Hence, the process advances to step S919. Otherwise, the load position of the original image is updated to the load position of the next image data. Then, the process returns to step S905 to load the image data of the next original and generate output image data in the same way as the above-described processing. In step S919, the CPU 107 determines whether the number n of processed copies is smaller than the number N of copies designated by the user. If the number n of copies is smaller, copy processing of the original of the next copy needs to be performed. Hence, the process returns to step S903 to return the load position of the original image data saved in the HDD 110 to the start position and continue the processing. On the other hand, if the number n of processed copies reaches the designated number N of copies, copy of all originals designated by the user is completed, and the processing ends.

Accordingly, for example, as indicated by the example 801 or 803 in FIG. 8, when two double-sided originals are sort-output by double copy, the copy numbers can be printed in accordance with the setting of the check box 314.

Processing in a case of group output will be described next with reference to the flowchart of FIG. 10.

In the group output, first in step S1001, the CPU 107 returns the load position of the image data of the original saved in the HDD 110 to the start position. In step S1002, the CPU 107 initializes the variable n to "0". Next, the process advances to step S1003, and the CPU 107 loads image data of one original from the HDD 110 in accordance with the load position. Next, the process advances to step S1004, and the CPU 107 increments the variable n by one. Next, the process advances to step S1005 to start copy processing of N copies of the loaded original image data.

In step S1005, the CPU 107 determines whether double copy is set to the ON state in the double copy setting screen 301 shown in FIG. 3A. If double copy is set to the ON state, the process advances to step S1009. Otherwise, the process advances to step S1006. The processes of steps S1005 to S1016 are the same as the processes of steps S906 to S917 in FIG. 9 described above, and a description thereof will be omitted.

In step S1017, the CPU 107 determines whether processing of image data for the front side of double-sided printing in double-sided designation is in progress. If the image data is not image data only for one surface or for the front side in double-sided printing, processing of the next copy needs to be performed, and the process advances to step S1019. On the other hand, if processing of image data for the front side of double-sided printing is in progress, the process advances to step S1018 to process image data for the back side next. The CPU 107 loads the image data for the back side of the original from the HDD 110 and returns to step S1005. Then, output image data for the back side is generated without changing the number n of copies.

In step S1019, the CPU 107 determines whether the number n of processed copies is smaller than the number N of copies designated by the user. If the number n of copies is smaller, processing of the next copy needs to be performed, and the process returns to step S1003. At this time, in double-sided printing of a double-sided original, the image data (for example, the image "A" in the example 804 in FIG. 8) of the front side needs to be loaded again in step S1003. For this reason, the load position is returned to the load position of the immediately preceding image data. Alternatively, when printing only one surface, the load position is returned to the load start position of the image data to load the same image data again. In step S1003, the CPU 107 loads the image data from the updated load position and advances to step S1004 to increment the variable n by one and continue the processing.

Upon determining in step S1019 that the number n of processed copies reaches the number N of copies designated by the user, the process advances to step S1020. In step S1020, the CPU 107 determines whether processing up to image data of final original saved in the HDD 110 is completed. If it is determined that the processing up to the image data of the final original is not completed, N copies of image of the next original data need to be printed. Hence, the process advances to step S1021 to update the load position of image data to the start of the image data of the next original, and the process returns to step S1002. On the other hand, if the processing up to the final image data of the saved original image data is completed, generation of all output image data is completed, and the processing ends.

Accordingly, for example, as indicated by the example 802 or 804 in FIG. 8, when two double-sided originals are group-output by double copy, the copy numbers can be printed in accordance with the setting of the check box 314.

As described above, according to the first embodiment, even if double copy and copy number print are set, printing can be performed while giving different copy numbers to the layout regions in one output sheet. It is therefore possible to ensure uniqueness of the copy numbers of final products after a printed product obtained by double copy is cut.

Second Embodiment

In the above-described first embodiment, an example in which continuous copy numbers are assigned to the layout regions of one output sheet has been described. In the second embodiment, however, copy numbers are assigned such that the copy numbers continue when cutting is performed and the bundles of cut sheets are stacked. This facilitates aligning final products in the order of copy number after cutting of a printed product. Note that the hardware arrangement of an image forming apparatus 101 according to the second embodiment and the arrangement of a print system including the image forming apparatus 101 are the same as in the above-described first embodiment, and a description thereof will be omitted.

Figure 11:
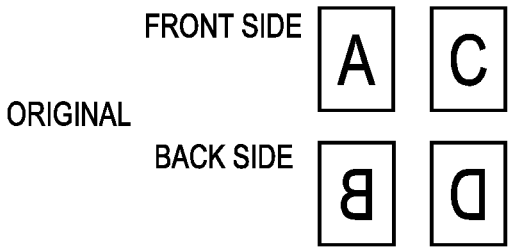
FIG. 11 depicts a view showing output examples in a case in which two double-sided originals are double-copied, and the position of copy number print is set at the upper left in a second embodiment.

FIG. 11 depicts a view showing output examples in a case in which two double-sided originals are double-copied, and the position of copy number print is set at the upper left in the second embodiment.

Reference numerals 1101 and 1102 denote output examples in a case in which a "print different copy numbers in double copy" check box 314 is set to the OFF state. These are the same as the examples 801 and 802 in FIG. 8 and do not solve the problem of the present application, and therefore, a description thereof will be omitted.

Reference numeral 1103 denotes an output example in a case in which the "print different copy numbers in double copy" check box 314 is set to the ON state in sort output. In this case, when all of six printed products are sequentially bundled such that the sheet on which an original "A" with a copy number "001" is printed is located on the top, the sheets are cut at the center in this state, and the bundle on the left side after cutting is stacked on the bundle on the right side, printed products with continuous copy numbers are obtained.

Reference numeral 1104 denotes an output example in a case in which the finishing setting in the settings of the example 1103 is changed to group output. In a case of group output, even when cutting is performed in a state in which all printed products are bundled, and two bundles are stacked, an expected result is not always obtained. However, when the sheets are bundled and cut on a group basis (a bundle of copies of the same original), and the bundle on the left side is stacked on the bundle on the right side, the copy numbers are arranged in ascending order from the sheet on the upper side of the bundle. Hence, the products can easily be aligned in the order of copy number.

Print image data generation processing will be described next. Note that a flowchart for explaining copy processing by the image forming apparatus 101 according to the second embodiment is the same as that in FIG. 7 of the above-described first embodiment, and a description thereof will be omitted.

Figure 12:
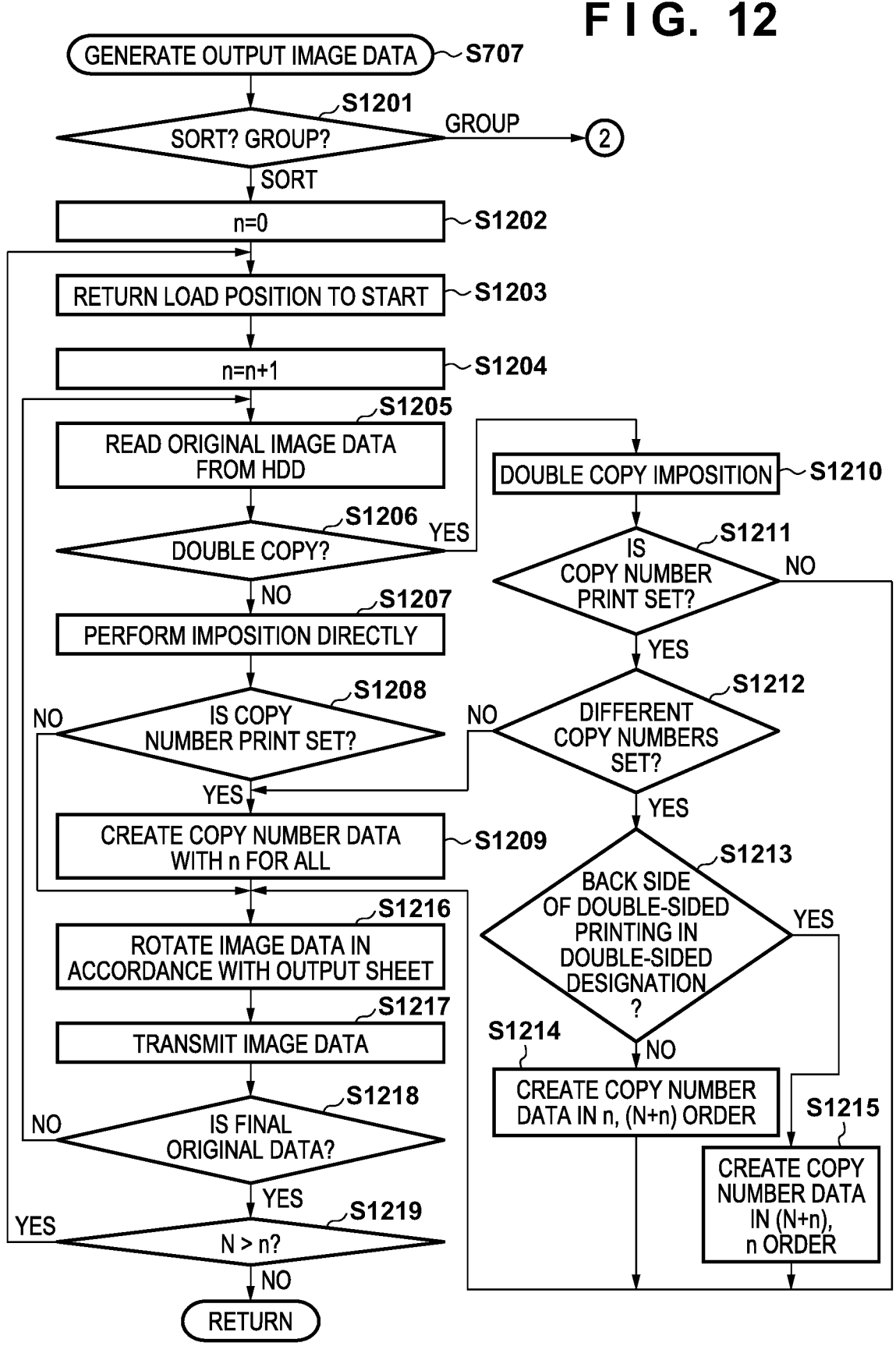
FIG. 12 is a flowchart for describing print image data generation processing in step S707 of the flowchart of FIG. 7 according to the second embodiment.
Figure 13:
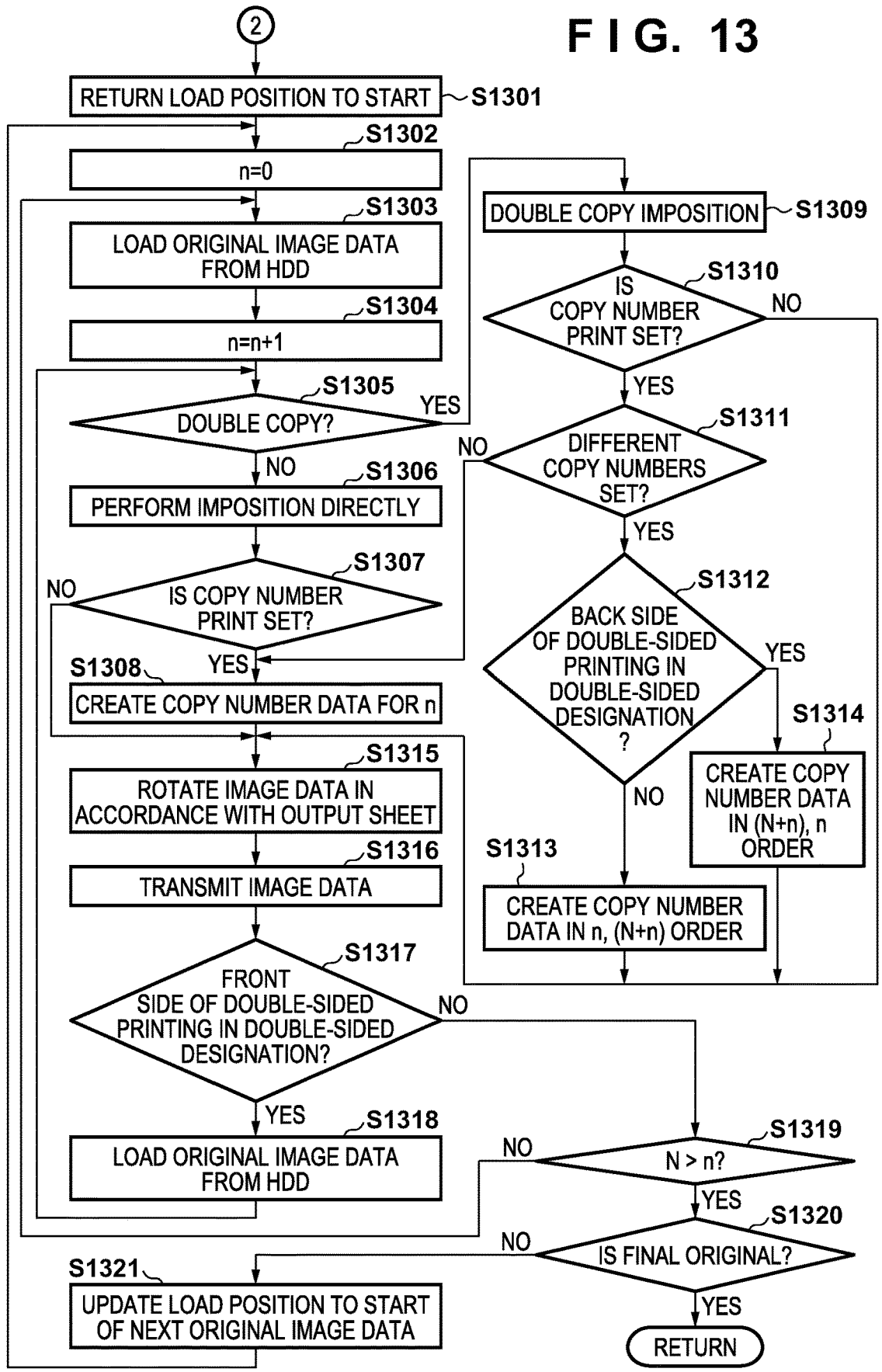
FIG. 13 is a flowchart for describing print image data generation processing in step S707 of the flowchart of FIG. 7 according to the second embodiment.

FIGS. 12 and 13 are flowcharts for describing print image data generation processing in step S707 of the flowchart of FIG. 7 according to the second embodiment.

Note that basic processing in these flowcharts is the same as in FIGS. 9 and 10 of the above-described first embodiment, and a repetitive description thereof will be omitted. That is, steps S1201 to S1213 and S1216 to S1219 in FIG. 12 are the same as steps S901 to S913 and S916 to S919 in FIG. 9. In addition, steps S1301 to S1312 and S1315 to S1321 in FIG. 13 are the same as steps S1001 to S1012 and S1015 to S1021 in FIG. 10.

The second embodiment is different from the first embodiment concerning processing in the manner the copy numbers are assigned in steps S1214 and S1215 (FIG. 12) and in steps S1313 and S1314 (FIG. 13). In both sort output and group output, when generating output image data not for the back side in double-sided printing in step S1213 or S1312, copy number data n is created for one layout region of one output sheet, and copy number data (N+n) is created for the other layout region, as in step S1214 or S1313. Here, as in the first embodiment, the variable N is the number of copies input by the user, and the variable n is the number of copies when print processing is being performed. For example, if the number of copies designated by the user is N=3, and the number of copies when print processing is being performed is n=1, "1" and "4" are printed as copy numbers. If n=2, "2" and "5" are printed as copy numbers (see the examples 1103 and 1104 in FIG. 11).

In addition, in both sort output and group output, when generating output image data for the back side in double-sided printing (YES in step S1213 or S1312), copy number data are created such that the copy number order is reverse to that on the front side as in step S1215 or S1314. In the above-described example, if n=1, "4" and "1" are printed as copy numbers. If n=2, "5" and "2" are printed as copy numbers (see the examples 1103 and 1104 in FIG. 11).

As described above, according to the second embodiment, even if double copy and copy number print are set, different copy numbers can be printed in the layout regions in one output sheet. It is therefore possible to ensure uniqueness of the copy numbers of final products after a printed product obtained by double copy is cut and easily arrange the sheets in the order of copy number.

That is, in sort output, copy numbers can be given to images laid out on output sheets such that the copy numbers are arranged in ascending order from the sheet on the upper side of a bundle when the bundle of output sheets as many as the number of copies is cut in accordance with the layout, and one bundle of cut output sheets is stacked on the other bundle. Additionally, in group output, copy numbers can be given to images such that the copy numbers on the cut output sheets are arranged in ascending order from above in a bundle when the first bundle of output sheets corresponding to the number of copies formed by the image data of the same original is cut in accordance with the layout, and one bundle of the cut first bundles is stacked on the other bundle.

Other Embodiments

Embodiments of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-229363, filed Nov. 29, 2017, which is hereby incorporated by reference herein in its entirety.

What is claimed is:

1. An image forming apparatus comprising:
a controller; and
a printer unit that prints an image on a sheet,
wherein the controller sets the number of copies, and
wherein in a case that the set number of copies is N (N being an integer more than 1) and a setting for printing an input image and the same image as the input image on a sheet surface of one sheet is performed, the printer unit prints the input image and a copy number of K ($1 \leq K \leq N$) on one side of a sheet surface of a sheet of a Kth copy, and prints the same image as the input image and a copy number of (N+K)th on the other side of the sheet surface of the sheet of the Kth copy.

2. The image forming apparatus according to claim 1, wherein the input image is printed on half of the sheet surface of the one sheet and the same image as the input image is printed on the other half of the sheet surface of the one sheet.

3. An image forming apparatus according to claim 1, wherein the controller further sets a position of the copy number to be printed on the sheet surface.

4. The image forming apparatus according to claim 1, further comprising:
a scanner unit that scans a document to generate image data,
wherein the input image is an image based on the image data generated by scanning the document.

5. The image forming apparatus according to claim 1, wherein the controller performs a first setting or a second setting,
wherein in a case that the controller performs the first setting, the printer unit prints on the sheet surface of one sheet two images that are the input image and the same image as the input image and a different copy number for each image of the two images, and
wherein in a case that the controller performs the second setting, the printer unit prints on the sheet surface of one sheet the two images and only one copy number.

6. The image forming apparatus according to claim 5, wherein in a case that the set number of copies is N and the first setting is performed, the printer unit prints the input image and a copy number of K ($1 \leq K \leq N$) on one side of the sheet surface of a sheet of the Kth copy, and prints the same image as the input image and a copy number of (N+K)th on the other side of the sheet surface of the sheet of the Kth copy.

7. An image forming apparatus comprising:
a controller; and
a printer unit that prints an image on a sheet,
wherein the controller performs a first setting or a second setting,
wherein in a case that the controller performs the first setting, the printer unit prints on a sheet surface of one sheet two images that are an input image and the same image as the input image and a different copy number for each image of the two images, and
wherein in a case that the controller performs the second setting, the printer unit prints on a sheet surface of the one sheet the two images and only one copy number.

8. The image forming apparatus according to claim 7, wherein the copy number is a number of serial numbers starting from 1.

9. The image forming apparatus according to claim 7, wherein the input image is printed on half of a sheet surface of the one sheet and the same image as the input image is printed on the other half of the sheet surface of the one sheet.

10. The image forming apparatus according to claim 7, wherein the controller sets a position of the copy number to be printed on the sheet surface.

11. The image forming apparatus according to claim 7, further comprising
a scanner unit that scans a document to generate image data,
wherein the input image is an image based on the image data generated by scanning the document.

12. The image forming apparatus according to claim 7, wherein the controller sets the number of copies,
wherein in a case that the set number of copies is N and the first setting is performed, the printer unit prints the input image and a copy number of K ($1 \leq K \leq N$) on one side of a sheet surface of a sheet of Kth copy, and prints the same image as the input image and a copy number of (N+K)th on the other side of the sheet surface of the sheet of the Kth copy.

13. A method of controlling an image forming apparatus, the method comprising:
printing an image on a sheet;
setting the number of copies; and
printing, in a case that the set number of copies is N and a setting for printing an input image and the same image as the input image on a sheet surface of one sheet is performed, the input image and a copy number of K ($1 \leq K \leq N$) on one side of a sheet surface of a sheet of a Kth copy, and the same image as the input image and a copy number of (N+K)th on the other side of the sheet surface of the sheet of the Kth copy.

14. A method of controlling an image forming apparatus, the method comprising:
printing an image on a sheet,
performing a first setting or a second setting,
printing, in a case that the first setting is performed, on a sheet surface of one sheet two images that are an input image and the same image as the input image and a different copy number for each image of the two images, and
printing, in a case that the second setting is performed, on the sheet surface of one sheet the two images and only one copy number.

* * * * *